(12) United States Patent
Wright

(10) Patent No.: US 9,527,482 B2
(45) Date of Patent: Dec. 27, 2016

(54) VEHICLE JACK

(76) Inventor: Peter John Wright, Harvey Bay (AU)

( * ) Notice: Subject to any disclaimer, the term of this patent is extended or adjusted under 35 U.S.C. 154(b) by 145 days.

(21) Appl. No.: 14/234,306

(22) PCT Filed: Jul. 23, 2012

(86) PCT No.: PCT/AU2012/000878
§ 371 (c)(1),
(2), (4) Date: Apr. 25, 2014

(87) PCT Pub. No.: WO2013/013264
PCT Pub. Date: Jan. 31, 2013

(65) Prior Publication Data
US 2014/0231730 A1    Aug. 21, 2014

(30) Foreign Application Priority Data
Jul. 22, 2011  (AU) ................................ 2011902931

(51) Int. Cl.
*B66F 3/00* (2006.01)
*B60S 9/02* (2006.01)
*B66F 1/02* (2006.01)
*B66F 13/00* (2006.01)

(52) U.S. Cl.
CPC .. *B60S 9/02* (2013.01); *B66F 1/02* (2013.01); *B66F 13/00* (2013.01)

(58) Field of Classification Search
CPC ............... B66F 1/02; B66F 13/00; B60S 9/02
USPC ........................................................ 254/134
See application file for complete search history.

(56) References Cited

U.S. PATENT DOCUMENTS

| | | | | |
|---|---|---|---|---|
| 1,146 A | * | 5/1839 | Vail ......................... | B66F 13/00 |
| | | | | 2/171.04 |
| 402,407 A | * | 4/1889 | Crecelius .................. | B66F 1/02 |
| | | | | 254/106 |
| 879,396 A | * | 2/1908 | Maxwell et al. ........ | B66F 13/00 |
| | | | | 254/85 |
| 1,100,344 A | * | 6/1914 | Berman ..................... | B66F 1/02 |
| | | | | 74/141.5 |
| 1,794,052 A | * | 2/1931 | Anderson ................. | B66F 1/06 |
| | | | | 248/352 |
| 1,814,570 A | | 7/1931 | Roberts, Jr. | |
| 1,931,033 A | | 10/1933 | Peter et al. | |
| | | (Continued) | | |

FOREIGN PATENT DOCUMENTS

| GB | 255319 | 7/1926 |
|---|---|---|
| GB | 1294124 | 10/1972 |

OTHER PUBLICATIONS

Supplementary European Search Report dated Jan. 7, 2015 from corresponding European Application No. EP20120816908.
(Continued)

*Primary Examiner* — Alvin Grant
(74) *Attorney, Agent, or Firm* — Wolf, Greenfield & Sacks, P.C.

(57) ABSTRACT

A vehicle jack comprising a first portion comprising a lower portion adapted to support the jack relative to a ground surface in a first orientation, a rest member extending from the lower portion and adapted to at least partially support the jack relative to the ground surface in a second orientation, and a support member extending from the lower portion, and a second portion movable relative to the support member, the second portion comprising a surface adapted to abut with a vehicle.

19 Claims, 18 Drawing Sheets

(56) References Cited

U.S. PATENT DOCUMENTS

| | | | | |
|---|---|---|---|---|
| 1,964,003 | A * | 6/1934 | McBride | B66F 3/42 |
| | | | | 254/93 H |
| 2,001,467 | A * | 5/1935 | Madigan | B66F 15/00 |
| | | | | 254/94 |
| 2,529,292 | A * | 11/1950 | Greenfield | B66F 3/30 |
| | | | | 248/354.6 |
| 2,820,608 | A * | 1/1958 | Braselmann | B66F 1/02 |
| | | | | 254/105 |
| 2,841,247 | A | 7/1958 | Smalley | |
| 2,885,181 | A | 5/1959 | McCully et al. | |
| 3,047,269 | A * | 7/1962 | Renshaw | B66F 3/30 |
| | | | | 254/133 R |
| 3,479,011 | A | 11/1969 | Miller | |
| 3,802,658 | A * | 4/1974 | Binding | B66F 1/04 |
| | | | | 248/352 |
| 3,970,278 | A * | 7/1976 | Studer | B66F 13/00 |
| | | | | 248/165 |
| 3,989,276 | A * | 11/1976 | Hamerl | B60S 9/04 |
| | | | | 280/475 |
| 4,165,861 | A * | 8/1979 | Hanser | B60S 9/12 |
| | | | | 254/423 |
| 4,238,113 | A * | 12/1980 | Adams | B66F 3/16 |
| | | | | 254/134 |
| 4,245,808 | A * | 1/1981 | John | B66F 3/08 |
| | | | | 248/165 |
| 4,277,050 | A | 7/1981 | Mostert | |
| 4,427,094 | A * | 1/1984 | Winkelblech | B66F 11/04 |
| | | | | 182/148 |
| 4,479,634 | A * | 10/1984 | Blatz | B66F 7/10 |
| | | | | 248/354.5 |
| 4,540,147 | A * | 9/1985 | Lincourt | B66F 13/00 |
| | | | | 248/351 |
| 4,609,179 | A | 9/1986 | Chern | |
| 4,635,904 | A * | 1/1987 | Whittingham | B60S 9/08 |
| | | | | 192/56.62 |
| 4,662,610 | A * | 5/1987 | Cofer | B60S 9/02 |
| | | | | 254/420 |
| 4,811,924 | A * | 3/1989 | Walters | B66F 13/00 |
| | | | | 248/352 |
| 4,856,747 | A * | 8/1989 | Gano | F16M 11/28 |
| | | | | 248/352 |
| 4,919,392 | A * | 4/1990 | Minuto | B66F 3/12 |
| | | | | 254/126 |
| 5,009,394 | A * | 4/1991 | Marshall | E01F 9/011 |
| | | | | 254/30 |
| 5,180,131 | A * | 1/1993 | Few | F16M 11/28 |
| | | | | 248/352 |
| 5,228,651 | A | 7/1993 | Warner | |
| 5,348,330 | A * | 9/1994 | Few | B60S 9/06 |
| | | | | 254/424 |
| 5,358,217 | A * | 10/1994 | Dach | B66F 3/00 |
| | | | | 254/134 |
| 5,423,518 | A * | 6/1995 | Baxter | B60S 9/08 |
| | | | | 254/419 |
| 5,490,656 | A * | 2/1996 | Frisby | B60S 9/04 |
| | | | | 248/352 |
| 5,497,969 | A * | 3/1996 | Broughton | B60D 1/66 |
| | | | | 248/352 |
| 5,501,428 | A * | 3/1996 | Garceau | B66F 3/12 |
| | | | | 254/424 |
| 5,603,486 | A | 2/1997 | Liu | |
| 5,711,512 | A * | 1/1998 | Kauffman | B66F 3/38 |
| | | | | 254/129 |
| 5,901,935 | A * | 5/1999 | Lai | F16M 11/24 |
| | | | | 248/354.1 |
| 5,915,672 | A * | 6/1999 | Dickey | B66F 3/24 |
| | | | | 248/352 |
| 6,019,337 | A * | 2/2000 | Brown | B60D 1/60 |
| | | | | 248/352 |
| 6,029,950 | A * | 2/2000 | Yeh | B66F 3/12 |
| | | | | 254/126 |
| 6,053,477 | A * | 4/2000 | Price | B66F 3/005 |
| | | | | 254/94 |
| 6,062,524 | A * | 5/2000 | Jackson, Sr. | B60D 1/66 |
| | | | | 248/352 |
| 6,145,813 | A * | 11/2000 | Anderson | B60S 9/08 |
| | | | | 254/418 |
| 6,224,102 | B1 * | 5/2001 | Nebel | B60S 9/06 |
| | | | | 254/424 |
| 6,322,062 | B1 * | 11/2001 | Conn | A47B 96/00 |
| | | | | 254/134 |
| 6,446,937 | B1 * | 9/2002 | Straw, Sr. | B60S 9/08 |
| | | | | 248/352 |
| 6,464,192 | B1 | 10/2002 | Gibbs, Jr. | |
| D468,512 | S * | 1/2003 | Hernandez | D34/23 |
| 6,517,112 | B1 * | 2/2003 | Watkins | B60S 9/04 |
| | | | | 254/418 |
| 6,612,533 | B2 * | 9/2003 | Biles | B25H 3/006 |
| | | | | 248/125.1 |
| 6,641,115 | B1 * | 11/2003 | Bainter | B66F 3/28 |
| | | | | 254/1 |
| 6,644,615 | B1 * | 11/2003 | Liu | B66F 13/00 |
| | | | | 248/346.07 |
| 6,722,635 | B2 * | 4/2004 | Erickson | B60S 9/08 |
| | | | | 254/103 |
| 6,726,236 | B2 * | 4/2004 | Cofer | B60D 1/36 |
| | | | | 254/420 |
| 6,902,148 | B1 * | 6/2005 | Spencer | B66F 3/30 |
| | | | | 254/2 B |
| 7,581,713 | B1 | 9/2009 | Voss | |
| D656,289 | S * | 3/2012 | Crump | D34/31 |
| 8,387,953 | B2 | 3/2013 | Drake | |
| 8,398,056 | B1 * | 3/2013 | Morrison | B66F 3/00 |
| | | | | 248/352 |
| 8,662,476 | B2 * | 3/2014 | Weddle | B66F 3/25 |
| | | | | 254/2 B |
| 8,714,528 | B1 * | 5/2014 | Young | B60S 9/04 |
| | | | | 254/419 |
| 8,944,455 | B2 * | 2/2015 | Lambros | B60S 9/02 |
| | | | | 280/475 |
| 8,973,899 | B2 * | 3/2015 | Buckingham | E04G 25/061 |
| | | | | 254/105 |
| 2004/0076501 | A1 * | 4/2004 | McGill | B62B 3/008 |
| | | | | 414/607 |
| 2010/0102284 | A1 * | 4/2010 | Drake | B66F 5/02 |
| | | | | 254/1 |

OTHER PUBLICATIONS

International Search Report and Written Opinion from corresponding International Application No. PCT/AU2012/000878, dated Sep. 14, 2012.
2nd Written Opinion from corresponding International Application No. PCT/AU2012/000878, dated Nov. 26, 2012, 7 pages.
Torin Scissor Jack, http://www.northerntool.com/shop/tools/product_200305251_200305251?cm_ven=google_PPC&cm_cat=Dynamic%20Search%20Ads%20Test&cm_pla=generic&cm_ite=_inpage:Jacks&mkwid=sNIPEE5C3&pcrid=26187844991&mt=b, 1 page, retrieved from internet Mar. 26, 2014.
Slee Offroad Prototype Portable Jack Stand, http://www.yotatech.com/f172/slee-offroad-prototype-portable-jack-stand-155695/, 6 pages, retrieved from internet Mar. 26, 2014.
25 Ton Vehicle Support Stands, http://www.shinnfuamerica.com/ProductDetails/Hein-Werner_Automotive/Jack_Stands_and_Forklift_Jack_Stands/HW93526A/1273, 1 page, retrieved from internet Mar. 26, 2014.

* cited by examiner

VEHICLE JACK

CROSS-REFERENCE TO RELATED APPLICATIONS

This application is a National Stage of PCT/AU2012/000878 filed Jul. 23, 2012, which claims the benefit of Australian Patent Application No. 2011902931, filed on Jul. 22, 2011, both of which are hereby incorporated by reference in their entirety.

FIELD OF THE INVENTION

The present invention relates to a vehicle jack. In some embodiments, the invention is directed to an adjustable vehicle jack, although the scope of the invention is not necessarily limited thereto.

BACKGROUND

Vehicle jacks are well-known and have been available in the marketplace for some time. A number of types of vehicle jacks are in existence, including screw jacks, hydraulic jacks, lever jacks, high lift jacks and pantograph jacks (scissor jacks). Typically, vehicle jacks are used to raise a vehicle (or at least a portion of a vehicle) off the ground such that a tyre may be changed.

Existing vehicle jacks are usually of complex constructions, having a lot of moving parts to be able to adequately jack up a vehicle. A problem with existing vehicle jacks is that substantial manual labour is required to jack up a vehicle. Typically, vehicle jacks are designed to be, stable at all times during use, in order to prevent injury or death to a person working on a raised vehicle should the jack give way. Thus, vehicle jacks are generally designed to resist tipping.

Another disadvantage with a majority of existing jacks is that they are vehicle-specific, that is, they are limited in application to a specific make or model of vehicles only and they are not designed to be used on other makes or models of vehicle.

It is an aim of the invention to provide a vehicle jack which overcomes or ameliorates one or more of the disadvantages or problems described above, or which at least provides the consumer with a useful or commercial choice.

It will be clearly understood that any reference herein to background material or information, or to a prior publication, does not constitute an admission that any material, information or publication forms part of the common general knowledge in the art, or is otherwise admissible prior art, whether in Australia or in any other country.

DESCRIPTION OF THE INVENTION

In one aspect, the present invention provides a vehicle jack comprising a first portion including a lower portion adapted to support the jack relative to a ground surface in a first orientation, a rest member extending from the lower portion and adapted to at least partially support the jack relative to the ground surface in a second orientation, and a support member extending from the lower portion, and a second portion movable relative to the support member, the second portion comprising a surface adapted to abut a vehicle.

In another aspect the invention resides broadly in a vehicle jack comprising a first portion including a base section (which can also be referred to as a lower portion) adapted to be located in contact with a ground surface when the jack is in a loaded condition, a rest member extending from the first portion and adapted to at least partially support the jack when the jack is in an unloaded condition, the vehicle jack further comprising a second portion associated with the first portion, the second portion including an abutment section adapted to abut a vehicle, the abutment section being located at a point on the vehicle jack separated by an adjustable distance from the base section.

It should be appreciated that when the jack is in an unloaded condition that there may be a load acting on the jack, however, the load will be relatively smaller than the load on the jack when the jack is in the loaded condition. Typically the jack will be in a first orientation when in the loaded condition and in a second orientation when in the unloaded condition. It is envisaged that, in the loaded condition, the jack supports at least a portion of the vehicle above the ground.

The second portion can be or can include an engagement member. The engagement member may also be referred to as an abutment member and/or an abutment section.

In one embodiment, the lower portion supports the jack relative to a ground surface in a first orientation. The lower portion is typically formed with or engages with the support member. Typically, a bearing surface of the lower portion (i.e. the surface that is in abutment with the ground surface) will be of a sufficient dimension to provide adequate support and stability to the jack. Normally the bearing surface of the lower portion will be of a larger dimension than the cross-sectional dimension of the support member extending from the lower portion. A skilled addressee will understand that the dimensions of the lower portion will typically comply with any relevant standards.

The lower portion may include a base plate. The base plate may be square, rectangular, circular or any other suitable shape. Alternatively, any suitably shaped lower portion may be used provided that a rest member extends from the lower portion and, preferably, that the lower portion complies with the relevant standards. For example, the lower portion may be a stand such as a tripod or a quad stand (4 legged stand).

In another embodiment, the rest member may be formed with the lower portion, although it is also envisaged that the rest member may be formed separately from the lower portion and adapted for temporary or fixed engagement thereto. Normally the rest member extends from one edge of the lower portion. Typically the rest member extends from one edge of the lower portion at an angle. The rest member may be disposed at any suitable angle to the lower portion, although it is envisaged that the rest member will extend at an angle of between approximately 90° and 180° to the lower portion (i.e. the rest member extends substantially outwardly from the lower portion). More preferably, the rest member may extend at an angle of between about 110° and 160° to the lower portion. Most preferably, the rest member may extend at angle of between about 130° and 140° to the lower portion. For example when the lower portion is supporting the jack relative to a ground surface (i.e. when the jack is in a first orientation) the rest member may extend from one edge of the lower portion at an angle of 45° relative to the ground surface (i.e. at an angle of approximately 135° to the lower portion). No particular limitation should be placed on the invention by the angle at which the rest member extends from one edge of the lower portion.

Alternatively, the rest member may be arcuate. If the rest member is arcuate, it will typically extend from one edge of the lower, portion at an angle which is substantially the same as the ground surface when the jack is in a first orientation.

For example, if the lower portion is a base plate, the rest member may extend from one edge of the lower portion in a curved manner. Preferably, in the example, the rest member is formed with the lower portion.

It will be understood that the rest member could encompass a plurality of members (for instance, a plurality of projections or finger members or the like) associated with the lower portion.

Typically the edge of the rest member which extends from one edge of the lower portion is of substantially the same dimension as the dimension of the edge of the lower portion from which it extends. Typically, the rest member projects from an edge of the lower portion along at least a portion of the length of the edge. In a preferred embodiment, the rest member projects from the edge of the lower portion along substantially the entire length of the edge. It is envisaged that the rest member may project from the edge of the lower portion a sufficient distance such that the rest member can at least partially support the jack relative to the ground surface in a second orientation.

Alternatively, the length of the rest member projecting from the edge of the lower portion may be sufficient to allow the rest member to fully support the jack relative to the ground surface in a second orientation. Typically in such an embodiment, the centre of gravity of the jack is vertically above the rest member when the jack is in the second orientation. It will be appreciated that, if the rest member is to fully support the jack relative to the ground surface in a second orientation, the rest member may be of sufficient size such that the centre of gravity of the jack is vertically above the rest member when the jack is in the second orientation.

The rest member may be provided with traction means adapted to provide traction relative to the ground surface. The traction means may be of any suitable form, such as, but not limited to, one or more ridges, ribs, blades, fingers, steps, dogs, pins, rods, knobs, projections and/or other members (or any combination thereof). For example, the rest member may be provided with a tread that is adapted to engage with the ground surface. A benefit of this is that the tread and/or the like may inhibit, or substantially eliminate, slippage of the jack during use (e.g. when the jack is moving from the second orientation to the first orientation).

In some embodiments of the invention, the angle of the rest member to the lower portion may be adjustable. In this embodiment of the invention, the rest member may be connected to the lower portion in a manner that allows the rest member to pivot relative to the lower portion. For instance, the rest member may be hingedly attached to the lower portion.

In this embodiment, the rest member may be pivoted relative to the lower portion until the desired angle between the rest member and the lower portion is achieved. Once the desired angle has been achieved, it is envisaged that the position of the rest member will be locked relative to the lower portion. For instance, a user may lock the rest member in place manually using any suitable locking means (such as a pin, bolt, latch or the like). Alternatively, the rest member may pivot relative to the lower portion using a ratcheting mechanism, such that when the rest member reaches the desired position, the ratchecting mechanism automatically locks the rest member against further movement. A skilled addressee will understand that any suitable mechanism for pivoting the rest member relative to the lower portion, and locking the rest member against further movement, may be used.

The rest member may be pivotably attached directly to the lower portion. Alternatively, the rest member may be connected to a pivoting portion of the lower portion. For instance, the rest member may be at least partially inserted into a pivoting socket that forms part of the lower portion. Notwithstanding, a skilled addressee will understand that the rest member may be connected to a pivoting portion of the lower portion using any suitable technique.

It is envisaged that, in embodiments of the invention in which the rest member is pivotably attached to the lower portion, the jack may be provided with indicia to allow a user to determine the angle at which the rest member is disposed to the lower portion and/or the support member.

In one embodiment, the support member is typically a structural section, and preferably a hollow structural section. Preferably the support member is a square (in cross-section) hollow structural section. However, the support member may also be rectangular, circular or elliptical in cross section. Preferably the support member is shaped such that when the engagement member is engaged and/or operatively associated with the support member there is substantially no rotation of the support member relative to the engagement member.

Alternatively, a suitably shaped cross section may be provided, such that rotation of the engagement member relative to the support member is possible. For example, the support member and/or engagement member may have a circular cross section (including a hollow circular cross section). Such an arrangement may be desirable if it is required to rotate the engagement member such that it can better engage with or abut a vehicle.

The support member may be selectively engageable with the engagement member. Typically the support member is removably attached to the engagement member by an attachment means. A skilled addressee will understand that any suitable attachment means may be used provided that the support member is removably attached to the engagement member. In a preferred embodiment, the support member and the engagement member may be provided with one or more apertures. In this embodiment of the invention, it is envisaged that, when the apertures are aligned, a fixation means (such as, but not limited to, a pin, rod or the like) may be passed at least partially through the respective apertures to attach the support member to the engagement member.

In some embodiments, the support member may be removably attached to the engagement member at a plurality of locations. For example the support member and/or the engagement member may be provided with apertures at multiple locations such that the relative distance between the support member and the engagement member may be adjusted. A benefit of having the support member removably attached to the engagement member is that different engagement members may be used. For example an engagement member for a square axle, round axle or an adjustable engagement member may be used. Thus different engagement members may be used on different types, makes or models of vehicles.

The support member may be formed with the lower portion. Alternatively, the support member may be formed separately to the lower portion and adapted for fixed or temporary attachment thereto.

Typically, the lower portion of the vehicle jack may be provided with reinforcing means. Any suitable reinforcing means may be provided, although in one embodiment of the invention, the reinforcing means may comprise at least one support rib. In this embodiment, the at least one support rib may be attached to the support member and the lower portion. Alternatively, at least one of the at least one support ribs may be attached to the support member, the lower portion and the rest member to provide additional strength. In a preferred embodiment, the lower portion is a base plate which is welded to the support member, and, in this embodiment, support ribs may be welded to the base plate and the support member for increased strength.

The support member may additionally include manipulation means adapted to enable the vehicle jack and/or support member to be manipulated by a user. Any suitable manipulation means may be provided, such as, but not limited to, one or more handles, grips, projections, or the like, or a combination thereof.

In another embodiment, the engagement member is typically a hollow structural section. Preferably the engagement member is a square hollow structural section, although it will be understood that any suitable cross-sectional shape may be used. Typically the cross sectional shape of the engagement member will be of a similar shape as the cross sectional shape of the support member. The cross-sectional area of the engagement member may be larger than the cross-sectional area of the support member such that the engagement member can 'slide' over the top of the support member. Alternatively, the cross-sectional area of the engagement member may be smaller than the cross-sectional area of the support member such that the engagement member is adapted to 'slide' into the support member. Alternatively, the support member may be a solid member and the engagement member may 'slide' over the top of the support member, or the engagement member may be a solid member and 'slide' into the (hollow) support member. The support member and engagement member may be of any suitable shape. A skilled addressee will understand that any suitably shaped support member and engagement member may be used provided that the engagement member is engageable and/or operatively associated with the support member. No particular limitation should be placed on the invention by the use of the words 'engagement' to describe the engagement member. It will be appreciated that the engagement member does not necessarily have to fixedly engage with the support member (i.e. it may be operatively associated and/or the like with the support member). Alternatively, the engagement member may simply abut the support member.

The engagement member may additionally include manipulation means adapted to enable the vehicle jack and/or engagement member to be manipulated by a user. Any suitable manipulation means may be provided, such as, but not limited to, one or more handles, grips, projections, or the like, or a combination thereof.

Typically, the engagement member is adapted to operatively engage with and/or abut a vehicle towards the first end of the engagement member. Normally the first end of the engagement member is the part of the engagement member that is furthest from the lower portion when the jack is in use.

In one embodiment, the engagement member preferably comprises capping means at or adjacent the first end of the engagement member. Any suitable capping means may be provided, such as, but not limited to, one or more caps, lids, membranes, seals or the like, or any suitable combination thereof. In a preferred embodiment of the invention, the capping means may comprise a head cap.

The head cap may also be referred to as an engagement section in some embodiments of the invention. The head cap is typically adapted to operatively engage and/or abut with a vehicle. Preferably, the head cap will be adapted to prevent the vehicle from slipping off the jack. The head cap is typically formed with or engages with the engagement member. The head cap may have an indentation, recess and/or the like to engage and/or abut with part of a vehicle. The head cap may further comprise at least one stop member such that it can securely engage and/or abut with a vehicle.

In a preferred embodiment of the invention, the head cap is removably attached to the second portion (or the engagement member). In this way different head caps may be attached to the second portion (or the engagement member) as required, depending on the type, make and model of the vehicle, or the part of the vehicle with which the jack is to abut.

In a preferred embodiment, the head cap comprises an abutment plate. Typically if the head cap comprises an abutment plate, the head plate will also comprise at least one stop member towards at least one edge thereof. Preferably, if the head cap comprises an abutment plate, the head plate will also comprise two stop members, each towards an opposed edge of the abutment plate. If required, the head cap may be additionally supported by at least one support rib, the at least one support rib being attached to the engagement member and the abutment plate.

Preferably the point of contact between the jack and the vehicle (which, in some embodiments of the invention, will be the head cap) will meet dimensional and stability requirements (e.g. relevant required standards) and be able to engage and/or abut securely with a vehicle.

In use, the jack may be wedged against the vehicle with the rest member in contact with the ground. For example, the engagement member may abut a vehicle towards the first end of the engagement member and the rest member is at least partially supporting the jack relative to the ground surface. Alternatively when the jack is in the second orientation, the jack may be supported by the rest member which is in contact with the ground surface (the centre of gravity of the jack is typically vertically above the rest member when the jack is in the second orientation). The vehicle may then be moved such that the engagement member abuts the vehicle towards the first end of the engagement member. Normally the vehicle is then moved such that the jack 'tips' from the second orientation to the first orientation. Typically in the first orientation the jack is substantially upright. It will be appreciated that, during the movement of the jack from the second orientation to the first orientation, the relative height of the first end of the engagement member to the ground surface will generally increase. Typically the increase of height of the first end of the engagement member will result in an increase of height (relative to the ground surface) of the part of the vehicle that is operatively engaged with and/or abuts the engagement member. In this manner, the vehicle (or at least a portion of the vehicle) will be lifted off the ground or at least further away from the ground so that access to the vehicle (for instance, to change a tyre) may be improved.

The components of the vehicle jack are normally made of a suitable metallic material. Preferably the components of the vehicle jack are made from steel. Alternatively the components may be made from an alloy, plastic, polymer, ceramic, composite and/or any material according to a suitable materials selection chart.

Preferably, the components of the vehicle jack also have a suitable corrosion protective coating. The nature of the corrosion protective coating is not critical to the invention, and a skilled addressee will understand that any suitable corrosion protective coating could be used.

If desired, the jack may be provided with markings. For example, the markings may include warnings against getting under a vehicle that is supported by a jack, instructions for operating the jack, height or load indicating indicia and/or the like.

A handle may be provided on any suitable part of the vehicle jack to enable the vehicle jack to be manipulated by a user.

No particular limitation should be placed on the invention by the use of the word vehicle. It should be understood that mention of the word vehicle in the present specification may include automobiles, cars, trucks, buses, trailers, caravans, tractors, motorcycles, bicycles, aircraft, watercraft, and/or the like, but not limited thereto.

BRIEF DESCRIPTION OF THE DRAWINGS

One or more preferred embodiments of the invention will now be described, by way of example only, with reference to the accompanying drawings in which.

BEST MODE

Figure 1:
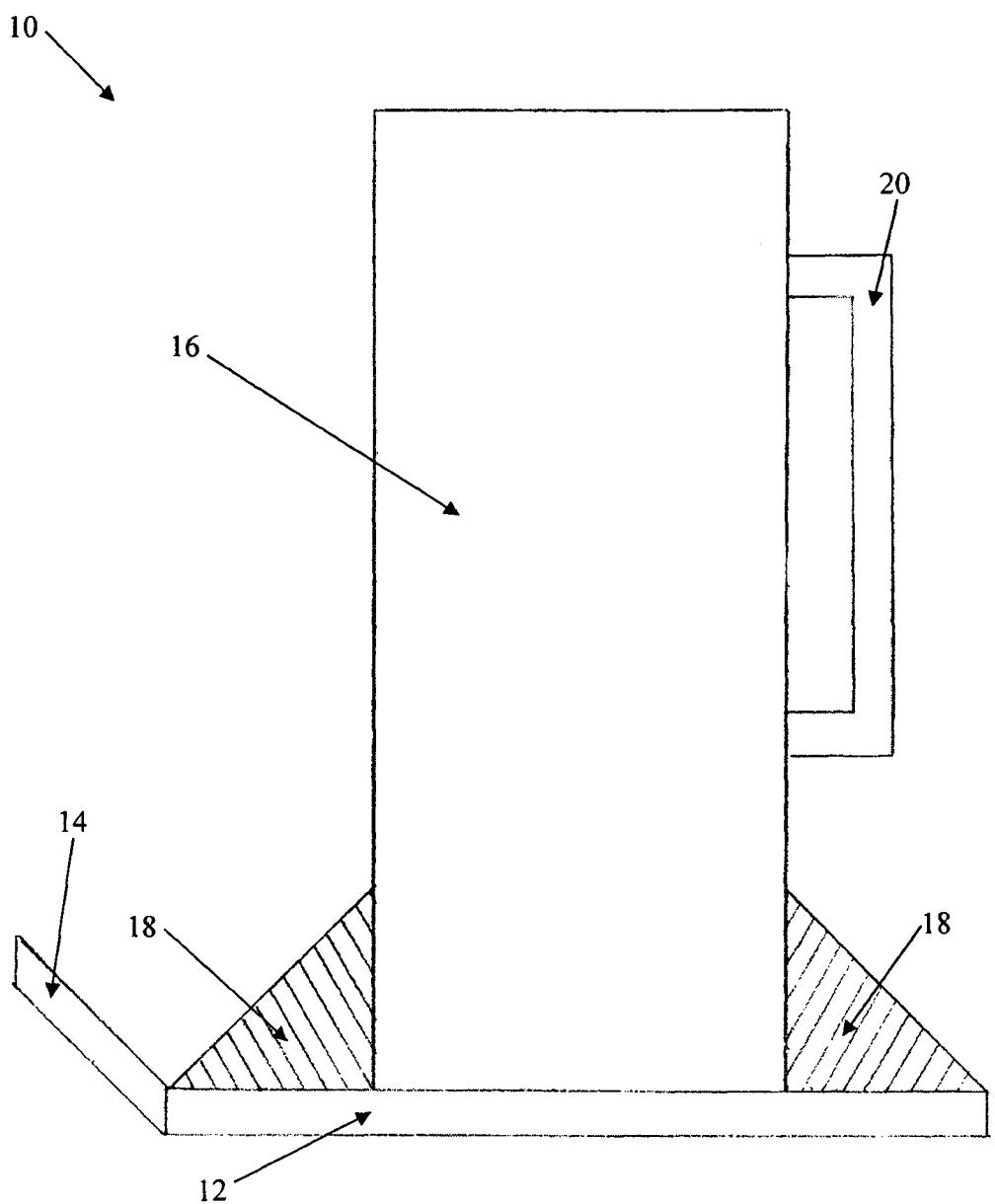
FIG. 1 is a side view of a base section of a vehicle jack according to an embodiment of the present invention.
Figure 2:
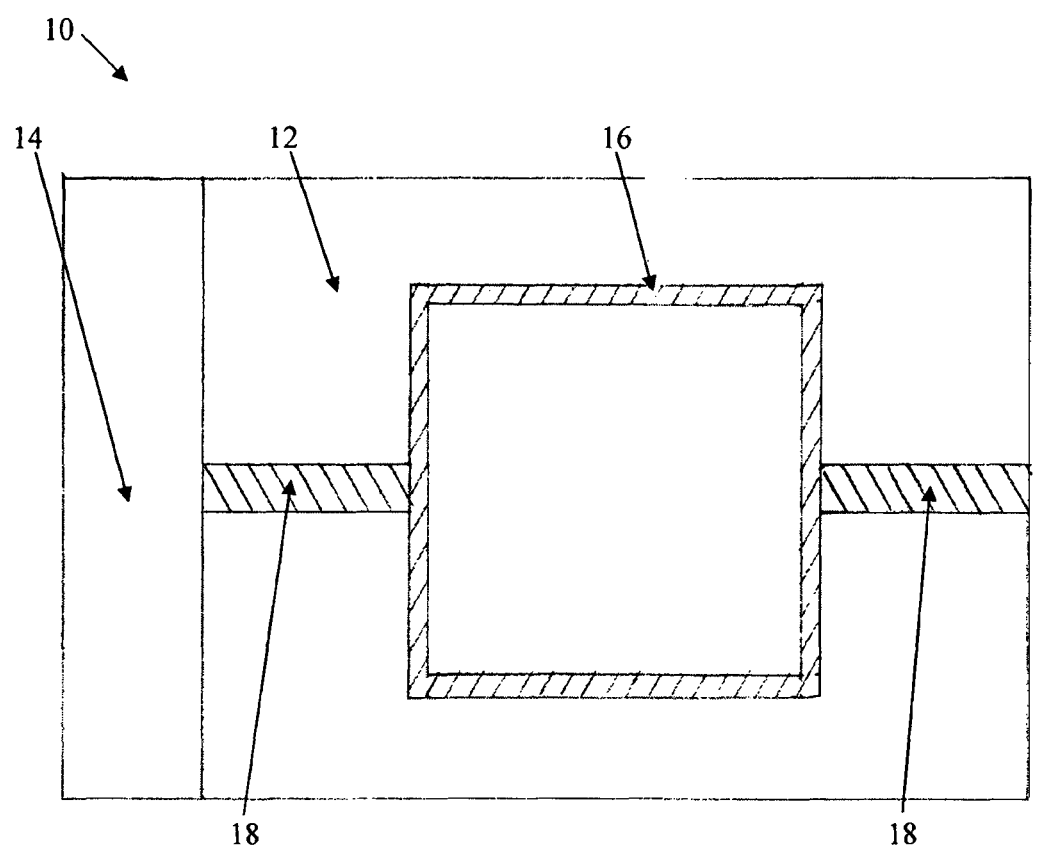
FIG. 2 is a top view of a base section of a vehicle jack according to an embodiment of the present invention.

With reference to FIGS. 1 and 2, there is shown a vehicle jack base section 10. The base section 10 comprises a lower portion in the form of a base plate 12 which is adapted to support the base section 10 relative to a ground surface (not shown), when the base section 10 is in a first orientation (e.g. upright). A rest member 14 extends from the base section 10 and is adapted to support the base section 10 relative to a ground surface (not shown), when the base section 10 is in a second orientation. A support member 16 is attached to the base plate 12. The support member 16 is a tubular member made from a hollow structural section. Support ribs 18 provide additional support between the support member 16 and the base plate 12, the support ribs 18 are attached to the base plate 12 and the support member 16. A handle 20 is attached to the support member 16. The handle 20 enables a user (not shown) to manipulate the base section 10.

Figure 3:
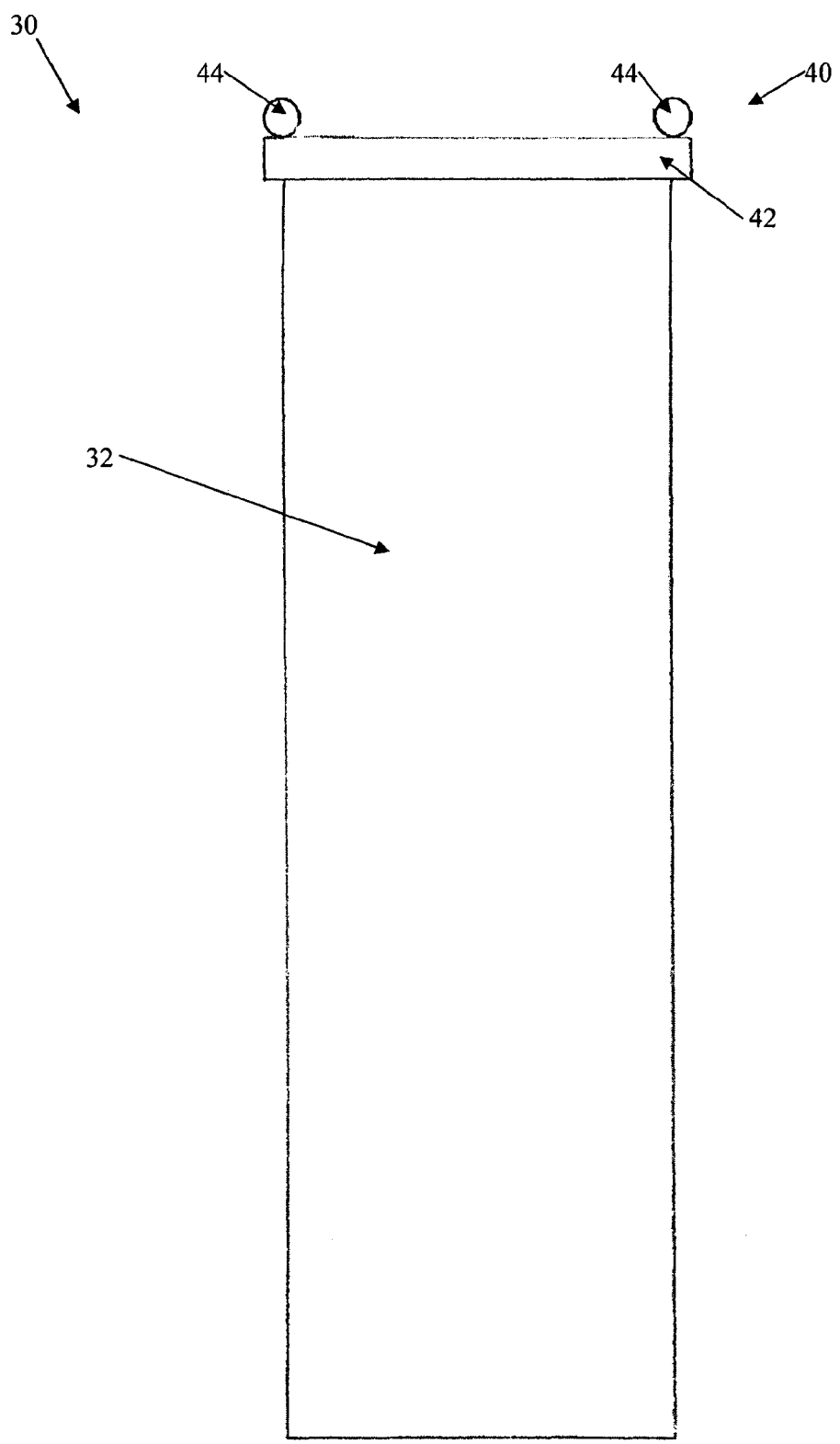
FIG. 3 is a side view of an insert for a vehicle jack according to an embodiment of the present invention.

With reference to FIG. 3, there is shown an engagement member in the form of an insert 30. The insert 30 is adapted to at least partially insert into the support member (not shown) of the base section (not shown). The insert 30 comprises an engagement member 32, which is a tubular member made from a hollow structural section. The engagement member 32 comprises a head cap 40 towards the first end of the engagement member 32. The head cap 40 comprises an abutment plate 42 and stop members 44. The head cap 40 is adapted to engage with a vehicle (not shown). In this case the head cap 40 is adapted to abut a part of a vehicle such as a differential case (not shown).

Figure 4:
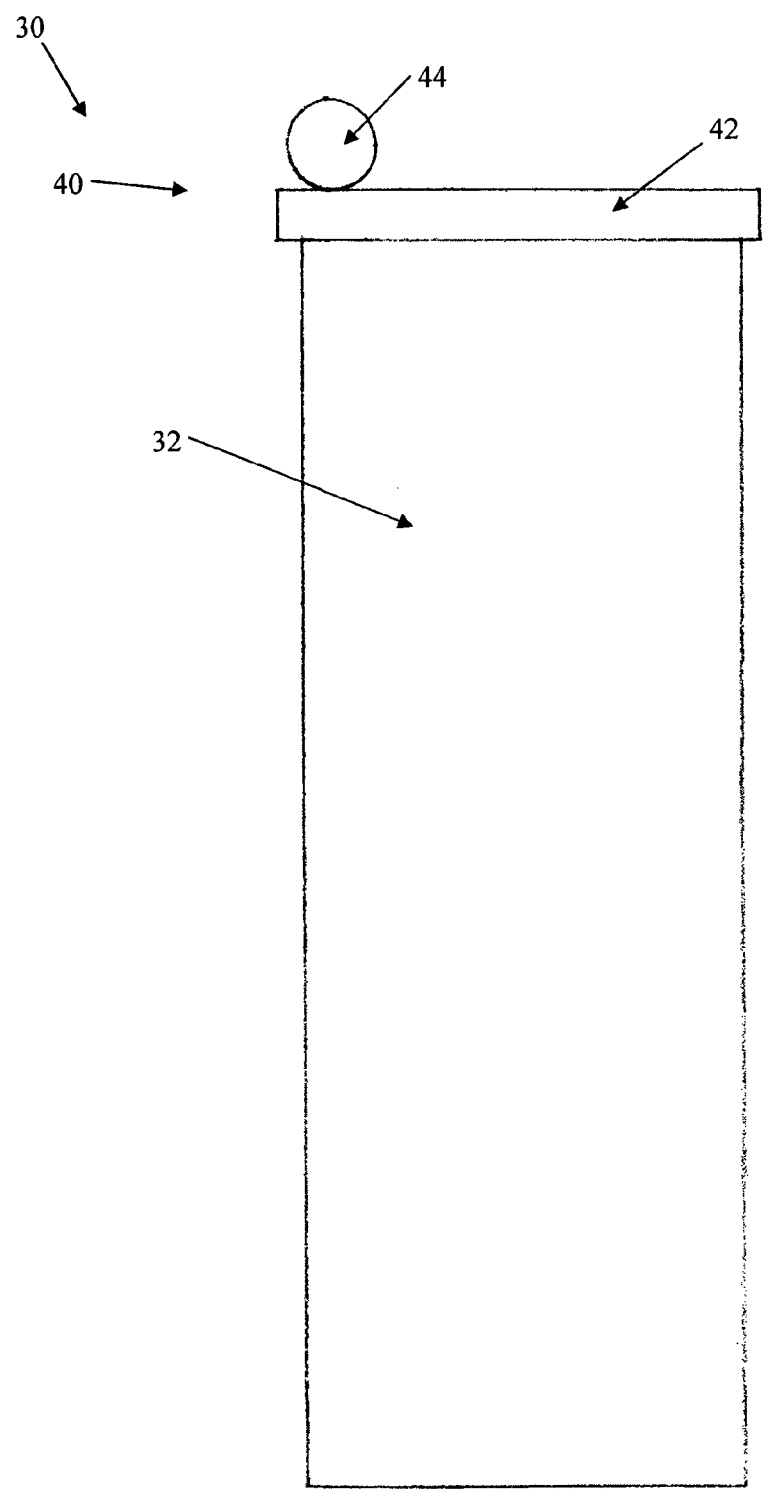
FIG. 4 is a side view of an insert for a vehicle jack according to an embodiment of the present invention.

With reference to FIG. 4, there is shown an insert 30. The insert 30 is adapted to at least partially insert into the support member (not shown) of the base section (not shown). The insert 30 comprises an engagement member 32, which is a tubular member made from a hollow structural section. The engagement member 32 comprises a head cap 40 towards the first end of the engagement member 32. The head cap 40 comprises an abutment plate 42 and a stop member 44. The head cap 40 is adapted to abut a vehicle (not shown). In this case the head cap 40 is adapted to abut a part of a vehicle such as a front axle (not shown).

Figure 5:
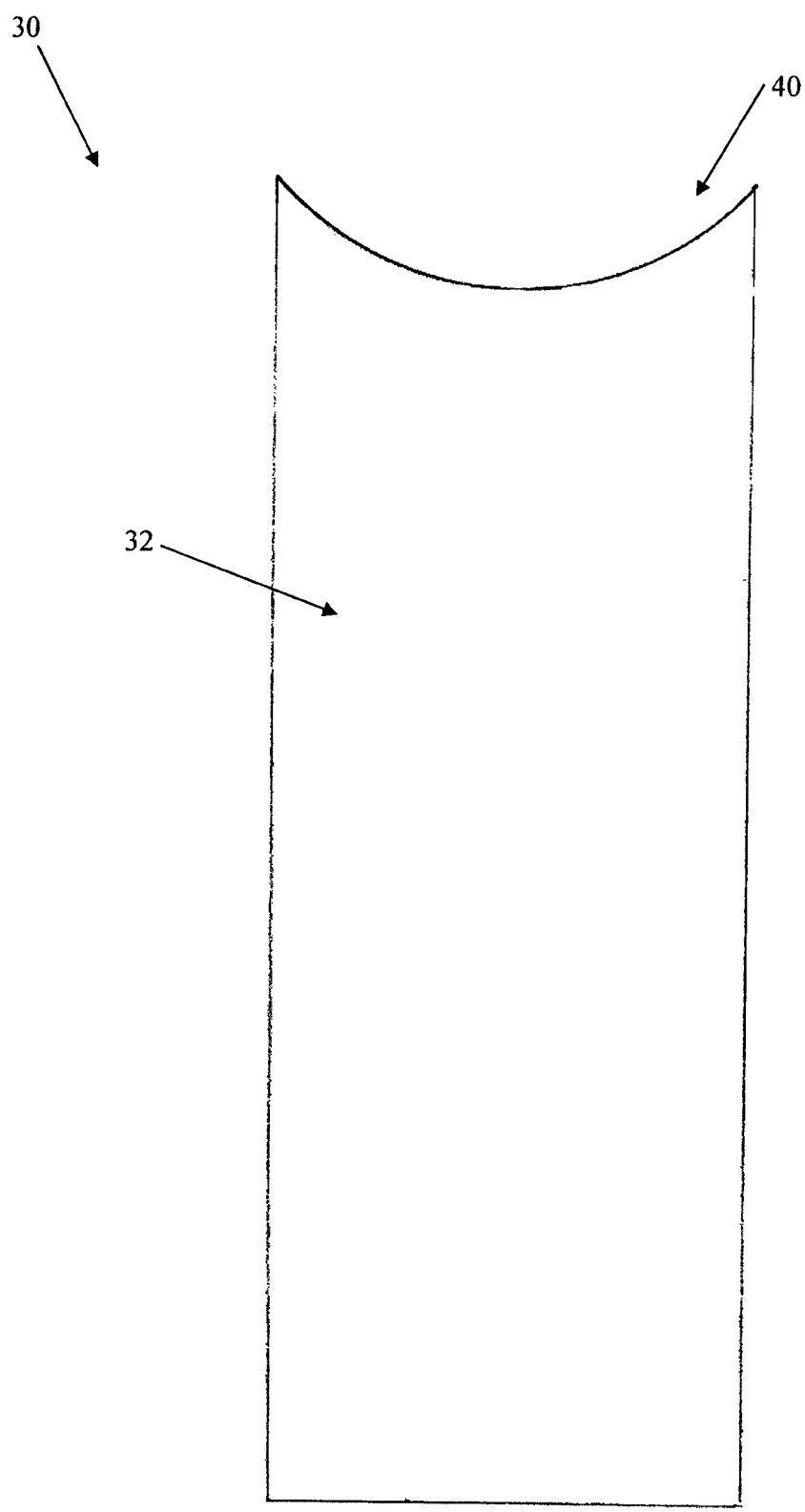
FIG. 5 is a side view of an insert for a vehicle jack according to an embodiment of the present invention.

With reference to FIG. 5, there is shown an insert 30. The insert 30 is adapted to at least partially insert into the support member (not shown) of the base section (not shown). The insert 30 comprises an engagement member 32, which is a tubular member made from a hollow structural section. The engagement member 32 comprises a head cap 40 towards the first end of the engagement member 32. The head cap 40 is curved and integrally formed with the engagement member 32. The head cap 40 is adapted to abut a vehicle (not shown). In this case the head cap 40 is adapted to abut a part of a vehicle such as a round axle (not shown).

Figure 6:
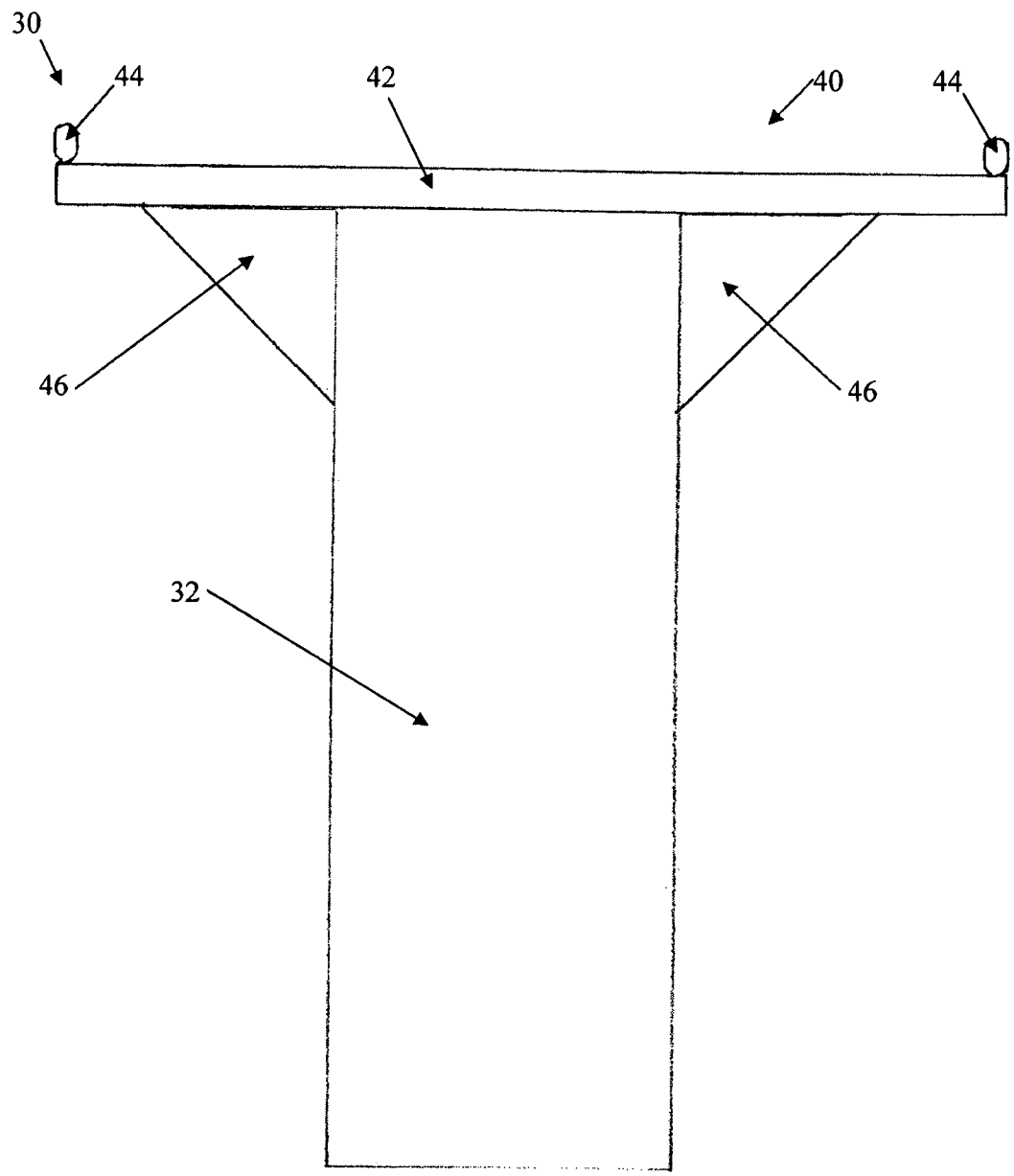
FIG. 6 is a side view of an insert for a vehicle jack according to an embodiment of the present invention.

With reference to FIG. 6, there is shown an insert 30. The insert 30 is adapted to at least partially insert into the support member (not shown) of the base section (not shown). The insert 30 comprises an engagement member 32, which is a tubular member made from a hollow structural section. The engagement member 32 comprises a head cap 40 towards the first end of the engagement member 32. The head cap 40 comprises an abutment plate 42 and stop members 44. The head cap 40 is additionally supported by support ribs 46 which attached to the engagement member 32 and the abutment plate 42. The head cap 40 is adapted to abut a vehicle (not shown). In this case the head cap 40 is adapted to abut a part of a vehicle such as a square axle (not shown).

Figure 7:
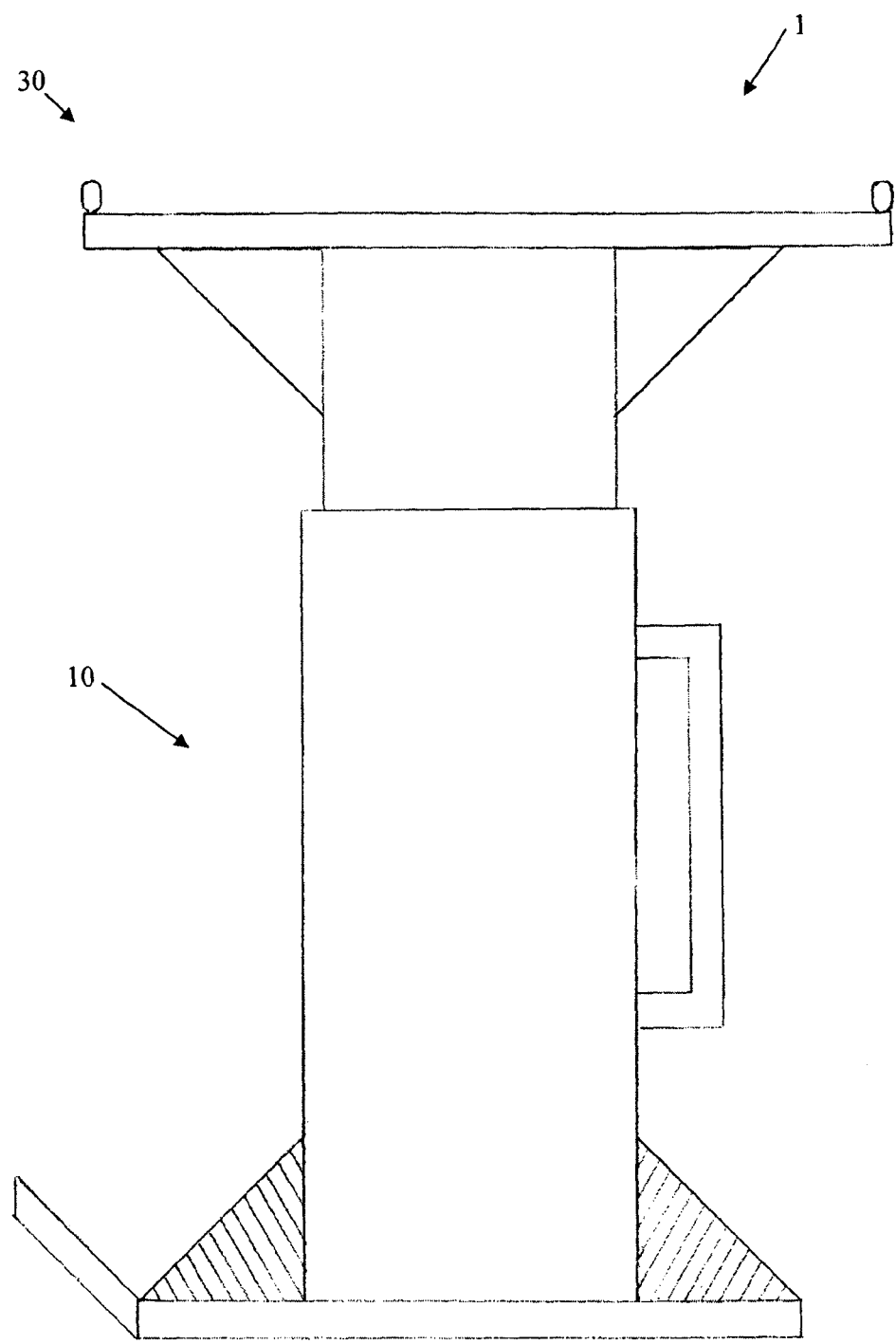
FIG. 7 is a side view of a vehicle jack according to an embodiment of the present invention.

With reference to FIG. 7, there is shown a vehicle jack 1, comprising the insert 30 inserted into the base section 10.

Figure 8:
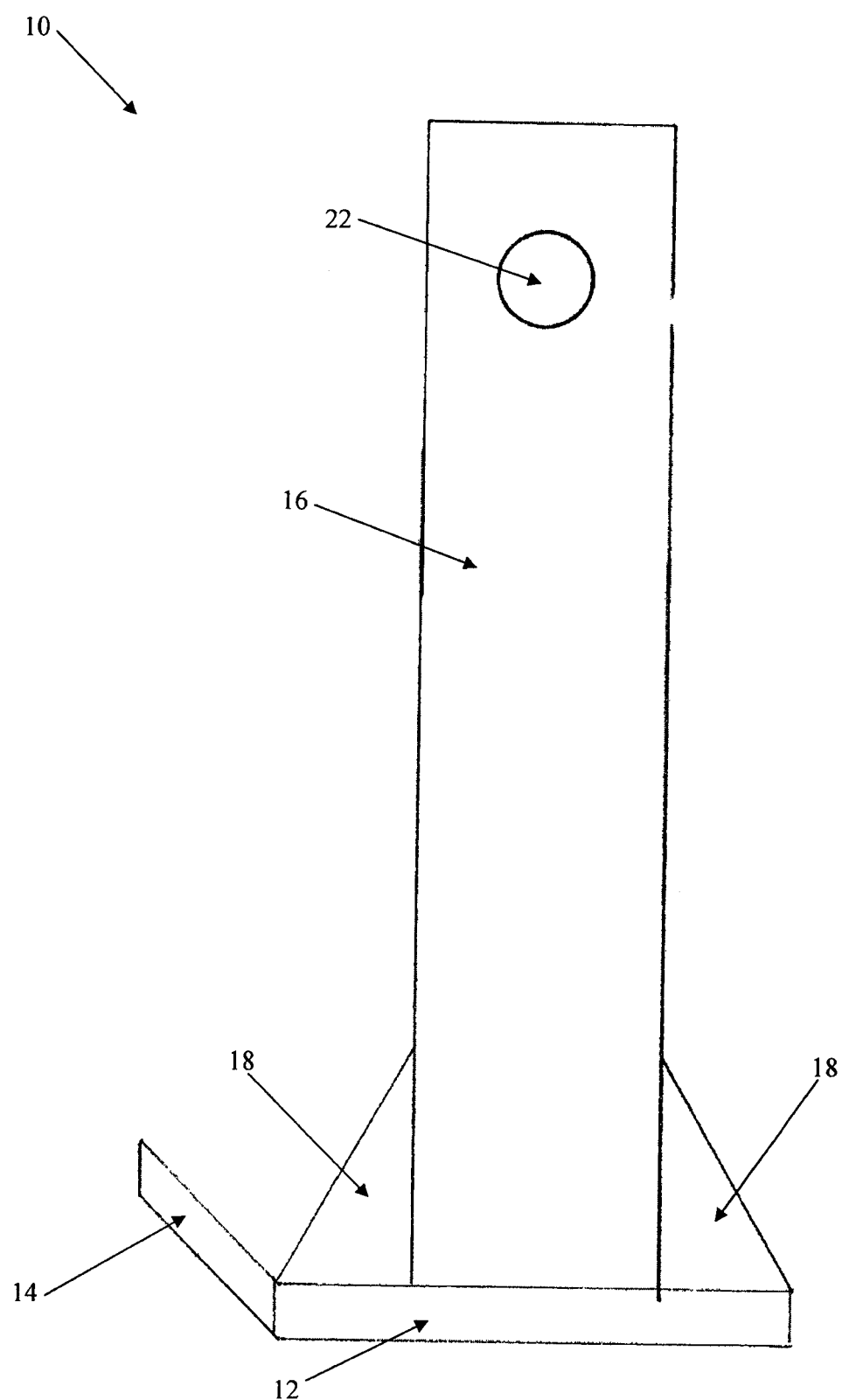
FIG. 8 is a side view of a base section of an adjustable vehicle jack according to an embodiment of the present invention.
Figure 9:
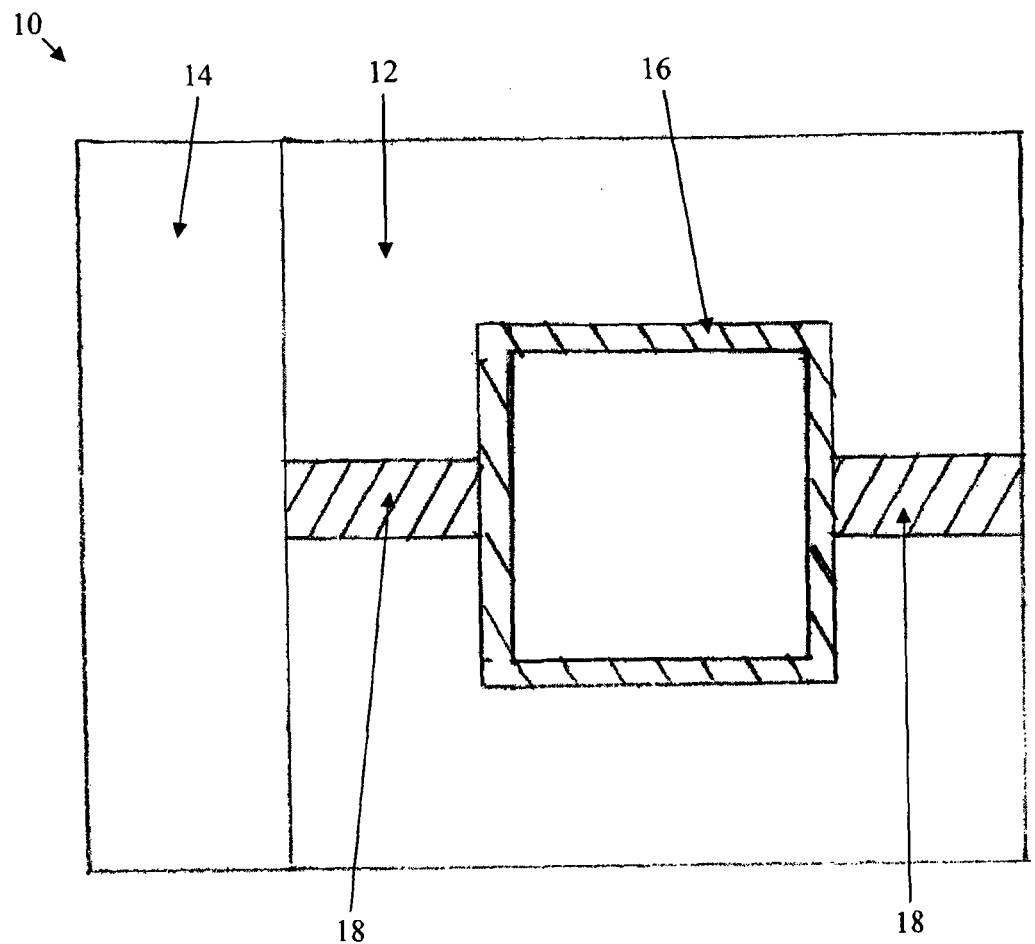
FIG. 9 is top view of a base section of an adjustable vehicle jack according to an embodiment of the present invention.

With reference to FIGS. 8 and 9, there is shown a vehicle jack base section 10. The base section 10 comprises a lower portion in the form of a base plate 12 which is adapted to support the base section 10 relative to a ground surface (not shown), when the base section 10 is in a first orientation (e.g. upright). A rest member 14 extends from the base section 10 and is adapted to support the base section 10 relative to a ground surface (not shown), when the base section 10 is in a second orientation. A support member 16 is attached to the base plate 12. The support member 16 is a tubular member made from a hollow structural section. The support member 16 has an aperture 22. Support ribs 18 provide additional support between the support member 16 and the base plate 12, the support ribs 18 are attached to the base plate 12 and the support member 16.

Figure 10:
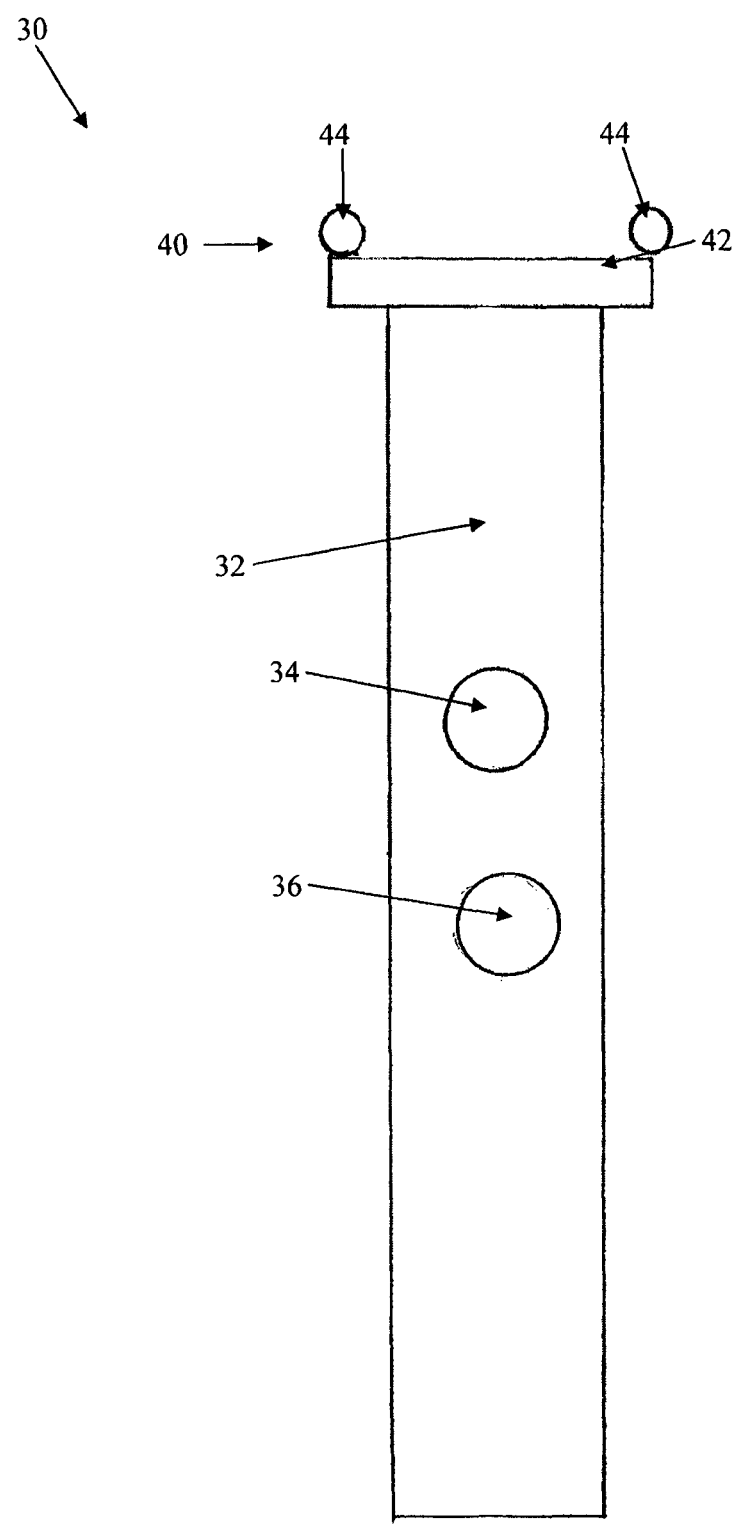
FIG. 10 is a side view of an adjustable insert for a vehicle jack according to an embodiment of the present invention.

With reference to FIG. 10, there is shown an insert 30. The insert 30 is adapted to at least partially insert into the support member (not shown) of the base section (not shown). The insert 30 comprises an engagement member 32, which is a tubular member made from a hollow structural section. The engagement member 32 comprises a head cap 40 towards the first end of the engagement member 32. The head cap 40 comprises an abutment plate 42 and stop members 44. The head cap 40 is adapted to abut a vehicle (not shown). In this case the head cap 40 is adapted to abut a part of a vehicle such as a differential case (not shown). The engagement member also has a first aperture 34 and a second aperture 36. The insert 30 is adjustable relative to the base section (not shown) in that the first aperture 34 or the second aperture 36 can be aligned with the aperture of the base section (not shown). The insert 30 can then be fixed in position relative to the base section (not shown) by using for example a pin (not shown) that is inserted in the aperture of the base section (not shown) and the first aperture 34 or the second aperture 36.

Figure 11:
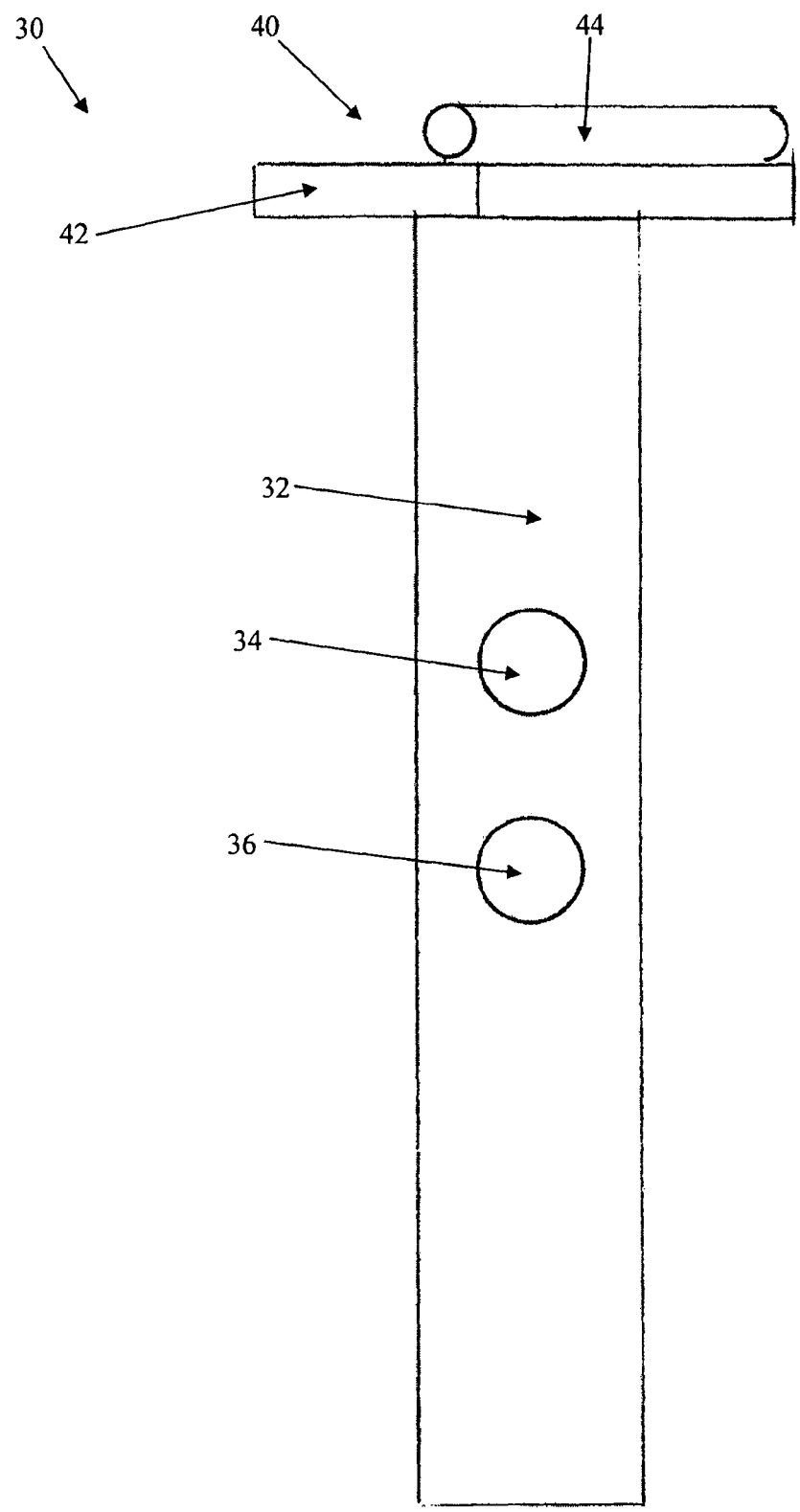
FIG. 11 is a side view of an adjustable insert for a vehicle jack according to an embodiment of the present invention.
Figure 12:
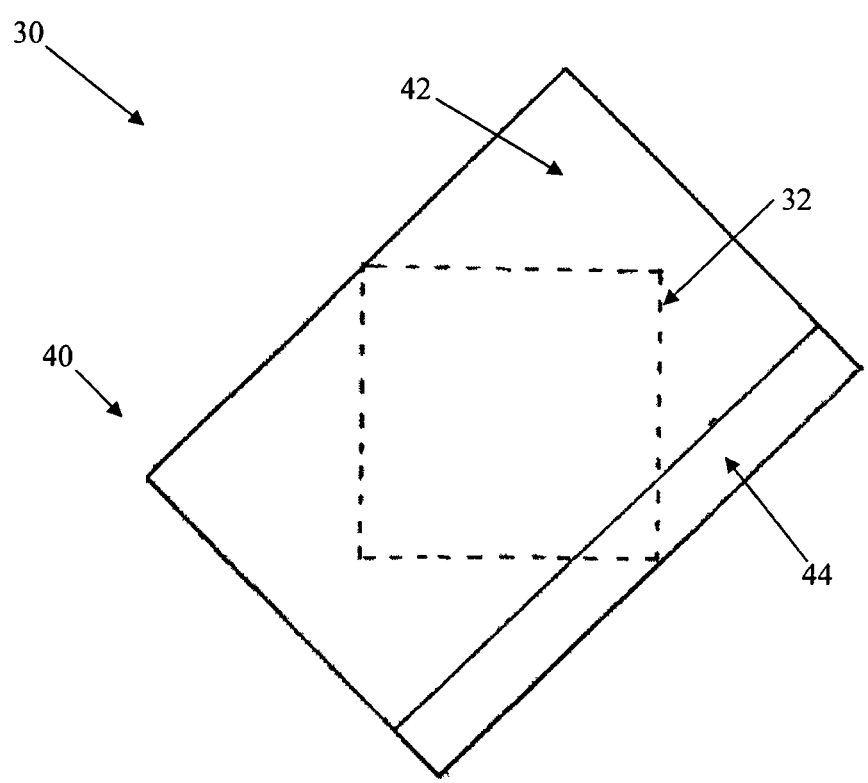
FIG. 12 is a top view of an adjustable insert for a vehicle jack according to an embodiment of the present invention.

With reference to FIGS. 11 and 12, there is shown an insert 30. The insert 30 is adapted to at least partially insert into the support member (not shown) of the base section (not shown). The insert 30 comprises an engagement member 32, which is a tubular member made from a hollow structural section. The engagement member 32 comprises a head cap 40 towards the first end of the engagement member 32. The head cap 40 comprises an abutment plate 42 and a stop member 44. The head cap 40 is aligned at an angle relative to the engagement member 32 (as can best be seen in FIG. 12). The head cap 40 is adapted to abut a vehicle (not shown). In this case the head cap 40 is adapted to abut a part of a vehicle such as a frame (not shown). The engagement member also has a first aperture 34 and a second aperture 36. The insert 30 is adjustable relative to the base section (not shown) in that the first aperture 34 or the second aperture 36 can be aligned with the aperture of the base section (not shown). The insert 30 can then be fixed in position relative to the base section (not shown) by using for example a pin (not shown) that is inserted in the aperture of the base section (not shown) and the first aperture 34 or the second aperture 36.

Figure 13:
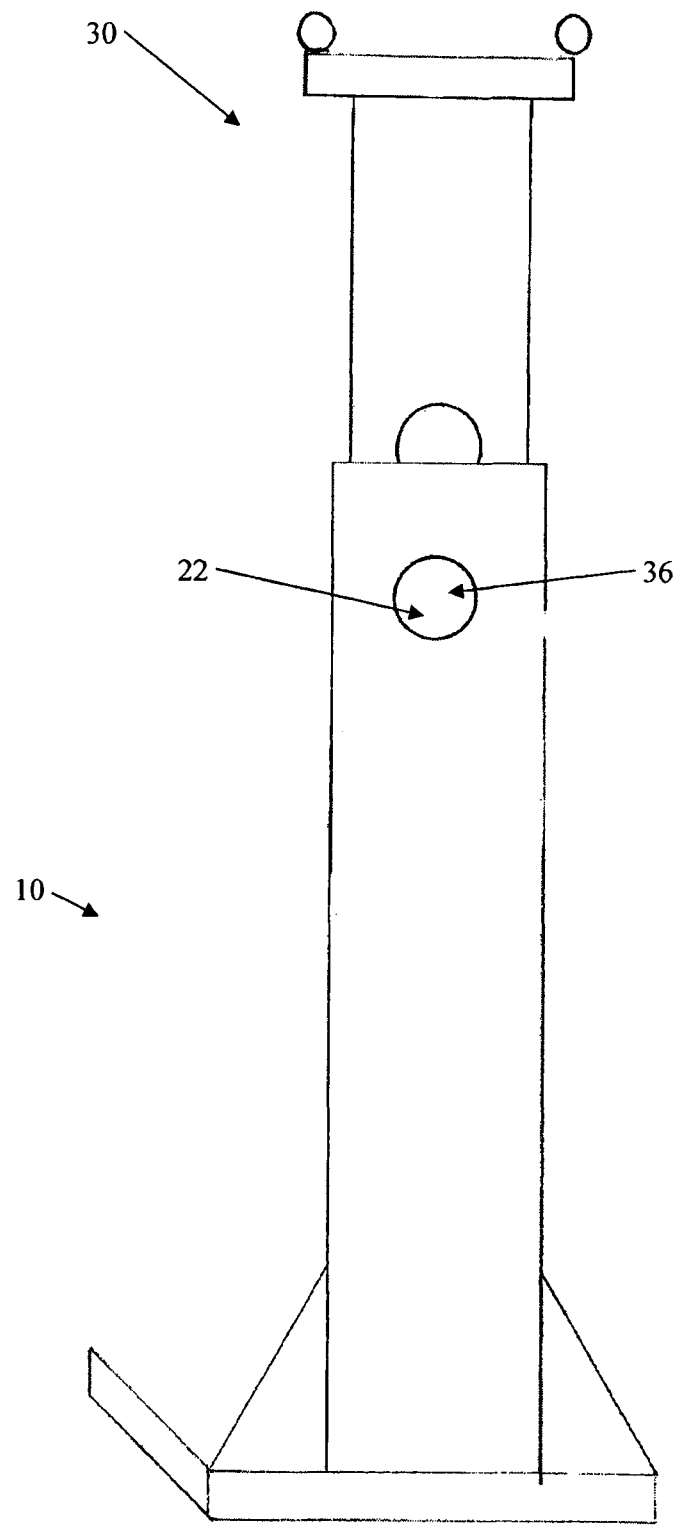
FIG. 13 is a side view of an adjustable vehicle jack according to an embodiment of the present invention.

With reference to FIG. 13, there is shown a vehicle jack 1, comprising the insert 30 inserted into the base section 10. It can be seen that second aperture 36 of the insert 30 is aligned with the aperture 22 of the base section 10. Typically a pin (not shown) would fix the insert 30 in position relative to the base section 10 by being inserted into the second aperture 36 and the aperture 22.

Figure 14:
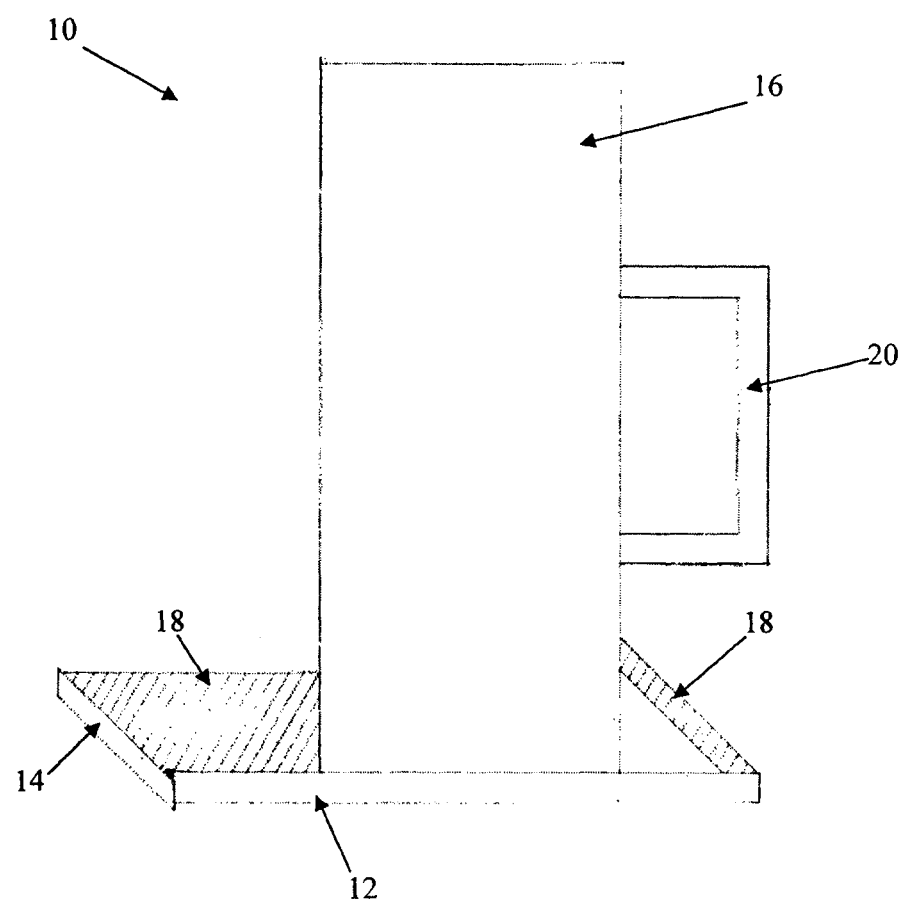
FIG. 14 is a side view of a base section of a vehicle jack according to an embodiment of the present invention.
Figure 15:
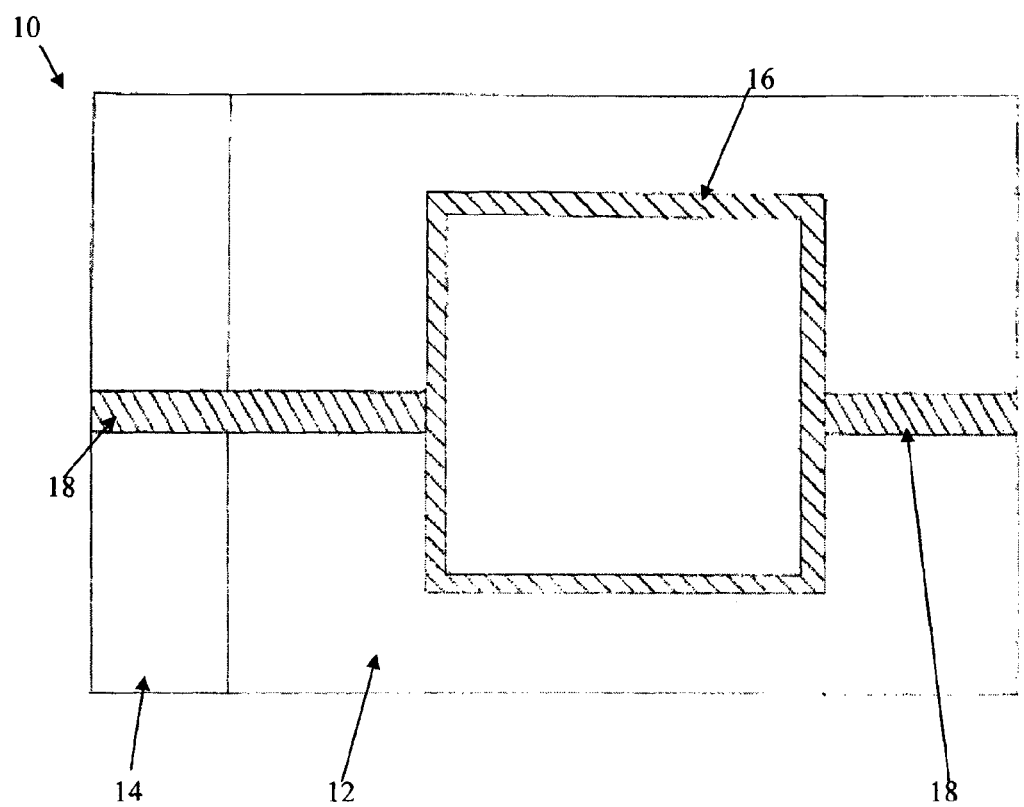
FIG. 15 is a top view of a base section of a vehicle jack according to an embodiment of the present invention.

FIGS. 14 and 15 illustrate a vehicle jack base section 10. The base section 10 is very similar to that shown in FIGS. 1 and 2, in that the base section 10 comprises a lower portion in the form of a base plate 12 which is adapted to support the base section 10 relative to a ground surface (not shown), when the base section 10 is in a first orientation (e.g. upright). A rest member 14 extends from the base section 10 and is adapted to support the base section 10 relative to a ground surface (not shown), when the base section 10 is in a second orientation. A support member 16 is attached to the base plate 12. The support member 16 is a tubular member made from a hollow structural section. A handle 20 is attached to the support member 16. The handle 20 enables a user (not shown) to manipulate the base section 10.

The major difference between the base section 10 shown in FIGS. 14 and 15 and that shown in FIGS. 1 and 2 is the location of the support ribs 18. In FIGS. 14 and 15, the support ribs 18 provide additional support between the support member 16, the base plate 12 and the rest member 14 through their attachment to the base plate 12, the rest member 14 and the support member 16.

Figure 16:
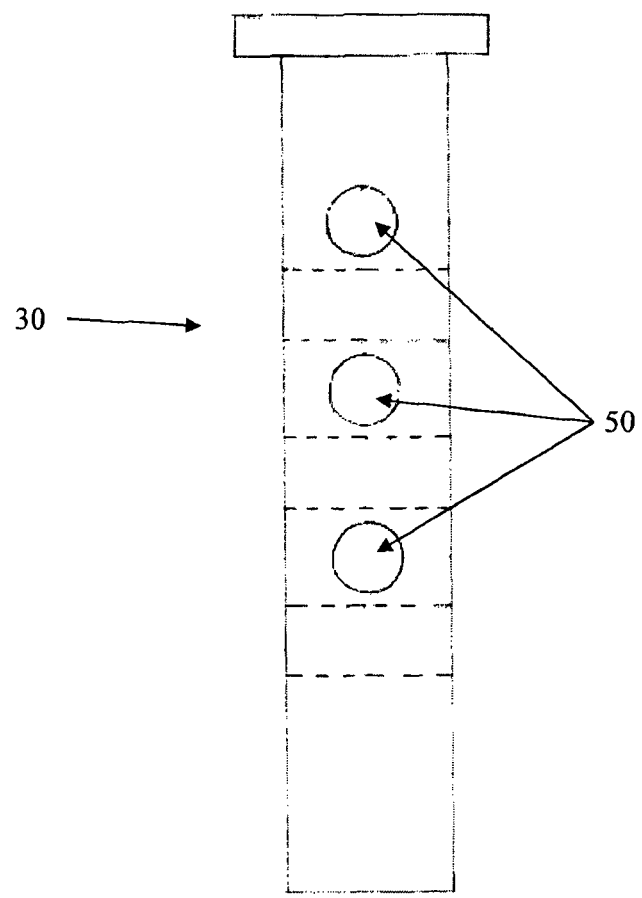
FIG. 16 is a side view of an insert for a vehicle jack according to an embodiment of the present invention.

FIG. 16 illustrates a side view of an insert 30 according to an embodiment of the invention. The insert 30 is similar to that shown in FIG. 10, in that the insert 30 is adjustable relative to the base section (not shown). A user can adjust the insert 30 so that the apertures 50 can be aligned with an aperture in the base section (not shown). The insert 30 can then be fixed in position relative to the base section (not shown) by using, for example, a pin (not shown) that is inserted in the aperture of the base section (not shown) and the chosen aperture 50.

Figure 17:
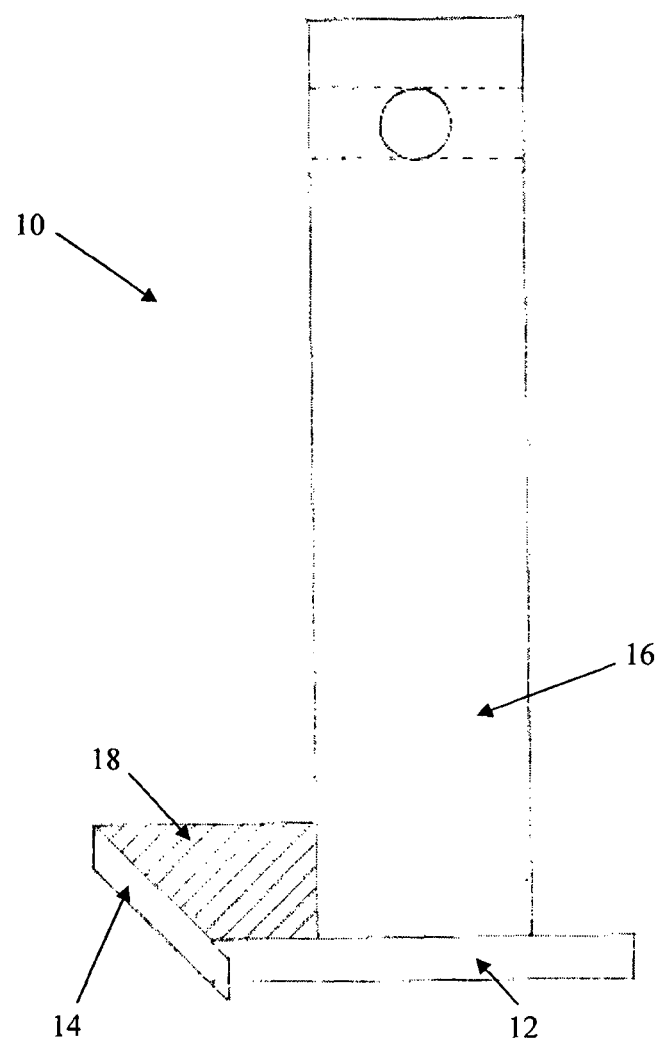
FIG. 17 is a side view of an adjustable vehicle jack according to an embodiment of the present invention.
Figure 18:
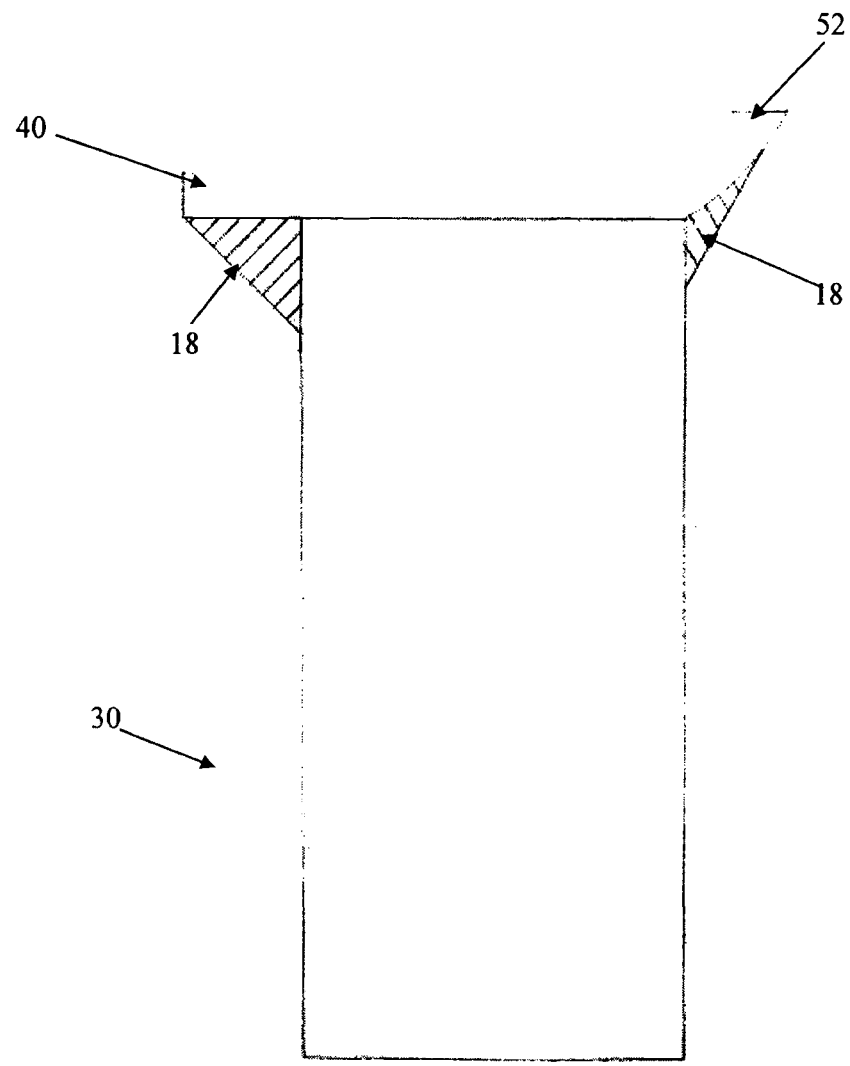
FIG. 18 is a side view of an insert for a vehicle jack according to an embodiment of the present invention.

FIG. 17 illustrates a side view of a base section 10 according to an embodiment of the present invention. The base section 10 is virtually identical to that illustrates in FIG. 18 with the exception that the base section 10 has a single support rib 18 that interconnects the support member 16, the base plate 12 and the rest member 14.

In FIG. 19 there is shown a side view of an insert 30 according to an embodiment of the invention. The insert 30 is similar to those shown in previous Figures, with the exception that the head cap 40 adapted to abut a vehicle (not shown) includes a lip 52 formed from a roller portion of the head cap 40 that effectively acts as a stop member. The insert 30 also includes support ribs 18 that interconnect the insert 30 with the head cap 40.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

In the present specification and claims (if any), the word "comprising" and its derivatives including "comprises" and "comprise" include each of the stated integers but does not exclude the inclusion of one or more further integers unless the context of use indicates otherwise.

Reference throughout this specification to "one embodiment", or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. A vehicle jack comprising:
   i) a first portion comprising:
      a lower portion adapted to support the jack relative to a ground surface in a first orientation;
      a rest member extending from the lower portion at an angle so that an apex is formed between the rest member and the lower portion and adapted to at least partially support the jack relative to the ground surface in a second orientation, and wherein at least a portion of the rest member extends below a lower surface of the lower portion when the jack is in the first orientation; and
      a support member extending from the lower portion, wherein the support member comprises a hollow structural section; and
   ii) a second portion movable relative to the support member, wherein the second portion includes an engagement member adapted for at least partial insertion into the support member.

2. A vehicle jack according to claim 1 wherein the jack is in the first orientation when in a loaded condition, and in the second orientation when in an unloaded condition.

3. A vehicle jack according to claim 2 wherein the jack supports at least a portion of the vehicle above the ground when in the loaded condition.

4. A vehicle jack according to claim 1 wherein the lower portion includes a base plate.

5. A vehicle jack according to claim 1 wherein the rest member extends outwardly from the lower portion at an angle of between about 110° and 160° to the lower portion.

6. A vehicle jack according to claim 1 wherein the rest member is arcuate.

7. A vehicle jack according to claim 1 wherein the rest member comprises a plurality of members.

8. A vehicle jack according to claim 1 wherein the rest member is provided with traction means adapted to provide traction relative to the ground surface.

9. A vehicle jack according to claim 1 wherein the rest member is pivotably attached to the lower portion.

10. A vehicle jack according to claim 1 wherein the engagement member is removably attached to the support member by an attachment means.

11. A vehicle jack according to claim 1 wherein the engagement member is removably attachable to the support member at a plurality of locations.

12. A vehicle jack according to claim 1 wherein the jack is provided with a handle.

13. A vehicle jack according to claim 1 wherein the vehicle is a truck, bus or other heavy vehicle.

14. A vehicle jack according to claim 1 wherein the second portion comprises capping means, the capping means including a surface adapted to abut with a vehicle.

15. A vehicle jack according to claim 14 wherein the capping means includes at least one stop member adapted to prevent the vehicle from slipping off the jack.

16. A vehicle jack according to claim 14 wherein the capping means comprises a head cap.

17. A vehicle jack according to claim 16 wherein the head cap is removably attached to the second portion.

18. A vehicle jack comprising:
   i) a first portion comprising:
      a lower portion adapted to support the jack relative to a ground surface in a first orientation;
      a rest member extending from the lower portion at an angle so that an apex is formed between the rest member and the lower portion and adapted to at least partially support the jack relative to the ground surface in a second orientation, and wherein at least a portion of the rest member extends below a lower surface of the lower portion when the jack is in the first orientation, wherein the rest member extends at an upward angle to the ground surface when the jack is in the first orientation; and
      a support member extending from the lower portion, wherein the support member comprises a hollow structural section; and
   ii) a second portion movable relative to the support member, wherein the second portion includes an engagement member adapted for at least partial insertion into the support member.

19. A vehicle jack of claim 18, wherein the support member extends vertically when the jack is in the first orientation.

* * * * *